United States Patent [19]
Walter et al.

[11] Patent Number: 5,862,289
[45] Date of Patent: Jan. 19, 1999

[54] ADHESIVELESS FIBER OPTIC CONNECTOR, AND AN APPARATUS AND METHOD FOR TERMINATING A FIBER OPTIC CABLE TO AN ADHESIVELESS FIBER OPTIC CONNECTOR

[75] Inventors: Eric Walter, Westchester, Ill.; Donald W. Duda, Williams Bay, Wis.

[73] Assignee: Amphenol Corporation, Wallingford, Conn.

[21] Appl. No.: 801,142

[22] Filed: Feb. 18, 1997

[51] Int. Cl.⁶ .................................................. G02B 6/00
[52] U.S. Cl. .............................. 385/134; 385/76; 385/81
[58] Field of Search ................................. 385/76, 78, 81, 385/83, 134, 139; 29/33 E, 33 K, 700

[56] References Cited

U.S. PATENT DOCUMENTS

| | | | |
|---|---|---|---|
| Re. 31,515 | 2/1984 | Heldt | 350/96.21 |
| 4,139,260 | 2/1979 | Bouygues et al. | 350/96.22 |
| 4,148,557 | 4/1979 | Garvey | 350/96.2 |
| 4,178,068 | 12/1979 | Hoover | 350/96.21 |
| 4,209,227 | 6/1980 | Dubos et al. | 350/96.22 |
| 4,240,695 | 12/1980 | Evans | 350/96.21 |
| 4,354,731 | 10/1982 | Mouissie | 350/96.21 |
| 4,355,862 | 10/1982 | Kock | 350/96.2 |
| 4,435,036 | 3/1984 | Sasakawa | 350/96.2 |
| 4,458,983 | 7/1984 | Roberts | 350/96.2 |
| 4,515,434 | 5/1985 | Margolin et al. | 350/96.21 |
| 4,567,650 | 2/1986 | Balyansny et al. | 385/134 |
| 4,607,911 | 8/1986 | Rhodes | 350/96.2 |
| 4,645,295 | 2/1987 | Pronovost | 350/96.2 |
| 4,645,296 | 2/1987 | Cattin et al. | 350/96.21 |
| 4,648,688 | 3/1987 | Des Forges et al. | 350/96.21 |
| 4,674,833 | 6/1987 | Des Forges et al. | 350/96.21 |
| 4,679,895 | 7/1987 | Huber | 350/96.2 |
| 4,684,205 | 8/1987 | Margolin et al. | 350/96.21 |
| 4,687,288 | 8/1987 | Margolin et al. | 350/96.2 |
| 4,696,537 | 9/1987 | Bauer et al. | 350/96.2 |
| 4,705,352 | 11/1987 | Margolin et al. | 350/96.2 |
| 4,707,068 | 11/1987 | Moulin | 350/96.21 |
| 4,735,482 | 4/1988 | Yoshida et al. | 350/96.2 |
| 4,789,216 | 12/1988 | Schrott | 350/96.2 |
| 4,812,006 | 3/1989 | Osborn et al. | 350/96.21 |
| 4,812,009 | 3/1989 | Carlisle et al. | 350/96.21 |
| 4,838,641 | 6/1989 | Morimoto et al. | 350/96.21 |
| 4,877,303 | 10/1989 | Caldwell et al. | 350/96.21 |
| 5,052,768 | 10/1991 | Matumoto et al. | 385/76 |
| 5,088,804 | 2/1992 | Grinderslev | 385/81 |
| 5,107,536 | 4/1992 | Wall | 385/81 |
| 5,120,388 | 6/1992 | Knott | 385/76 |
| 5,125,059 | 6/1992 | Wall | 385/81 |
| 5,142,602 | 8/1992 | Cabato et al. | 385/87 |
| 5,185,837 | 2/1993 | Ayuta et al. | 385/81 |
| 5,208,887 | 5/1993 | Grinderslev | 385/81 |
| 5,214,732 | 5/1993 | Beard et al. | 385/78 |
| 5,239,602 | 8/1993 | Hunsberger et al. | 385/62 |
| 5,293,582 | 3/1994 | Beard et al. | 385/78 |
| 5,321,784 | 6/1994 | Cubukciyan et al. | 385/78 |
| 5,363,459 | 11/1994 | Hultermans | 385/60 |
| 5,396,572 | 3/1995 | Bradley et al. | 385/78 |
| 5,442,724 | 8/1995 | Deuel | 385/134 |

*Primary Examiner*—Hemang Sanghavi
*Attorney, Agent, or Firm*—Bacon & Thomas, PLLC

[57] ABSTRACT

An adhesiveless fiber optic connector includes a collet mechanism having cable gripping fingers for initially gripping a fiber buffer upon movement of the collet into a body of the connector, and which is subsequently secured within the connector by crimping, includes keying tabs which cooperate with slots in the main body of the connector for retaining the collet within the connector prior to termination, and for preventing rotation of the collet during termination, the keying tabs being pushed out of the slots during termination to adhere to the main body of the connector following crimping. An apparatus for facilitating termination of a fiber optic cable to such an adhesiveless connector includes a transport mechanism to which the fiber buffer is clipped, and a guiding mechanism in the form of separable jaws for the exposed fiber, as well as a crimp mechanism and fiber cutting and polishing apparatus. The apparatus can be used to carry out a method involving the steps of preparing the fiber cable for termination, capturing a bare fiber in a guiding mechanism, securing the fiber buffer to a transporting mechanism, and transporting the cable so that the cable is guided by the guiding mechanism into the collet, after which the transporting mechanism is used to push the collet into the connector and force keys of the collet out of their slots and grip the fiber buffer.

12 Claims, 13 Drawing Sheets

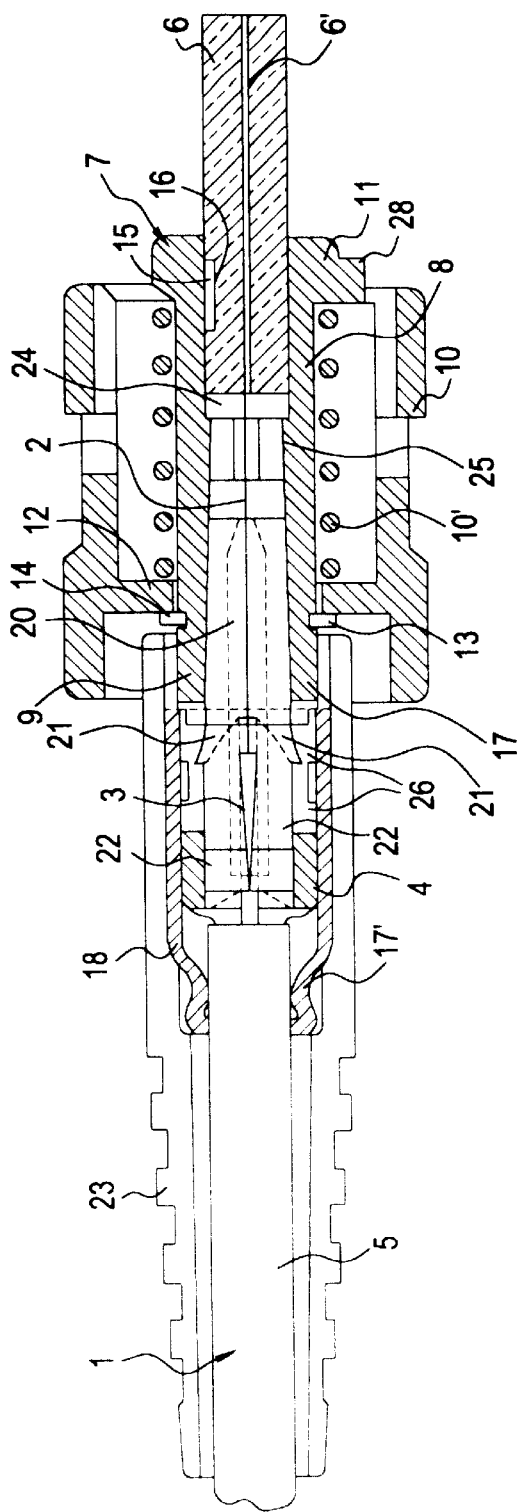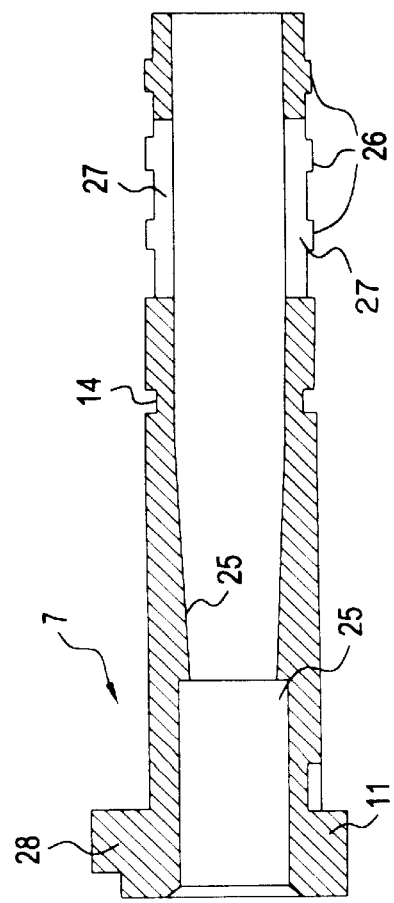

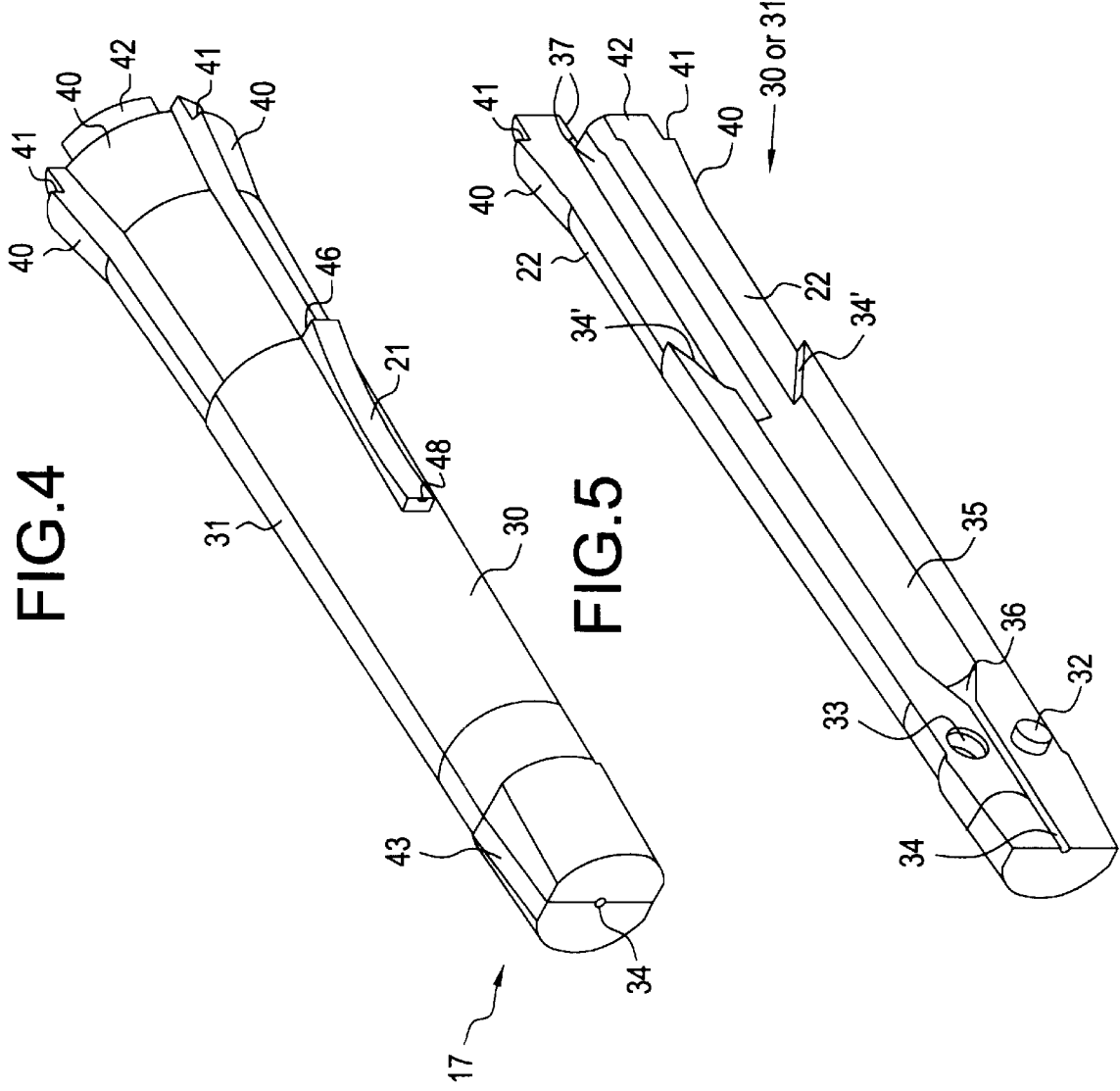

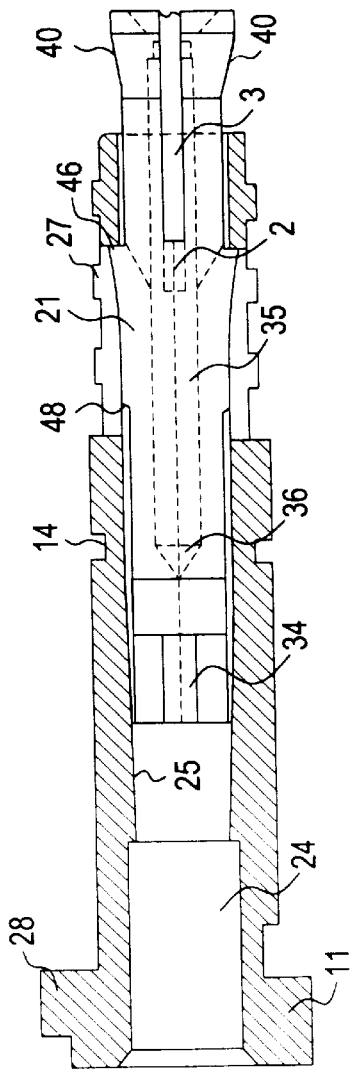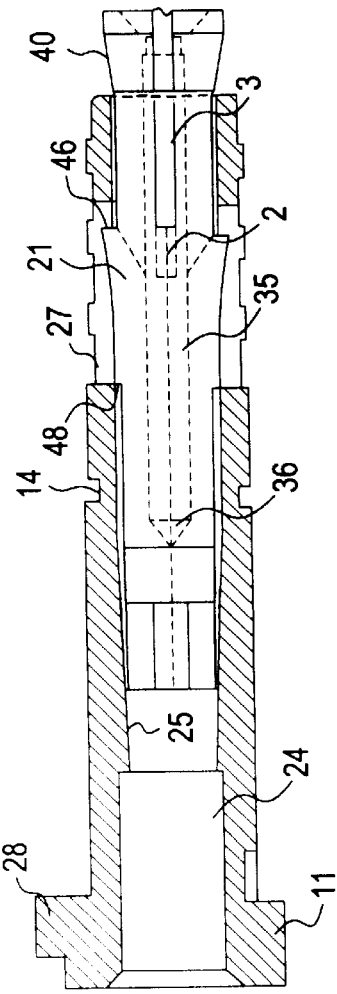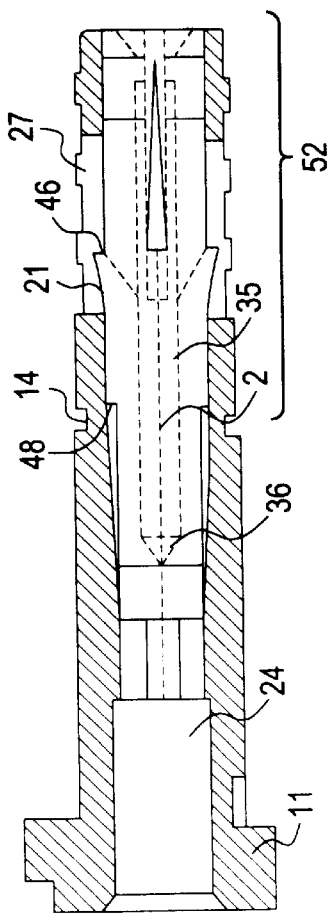

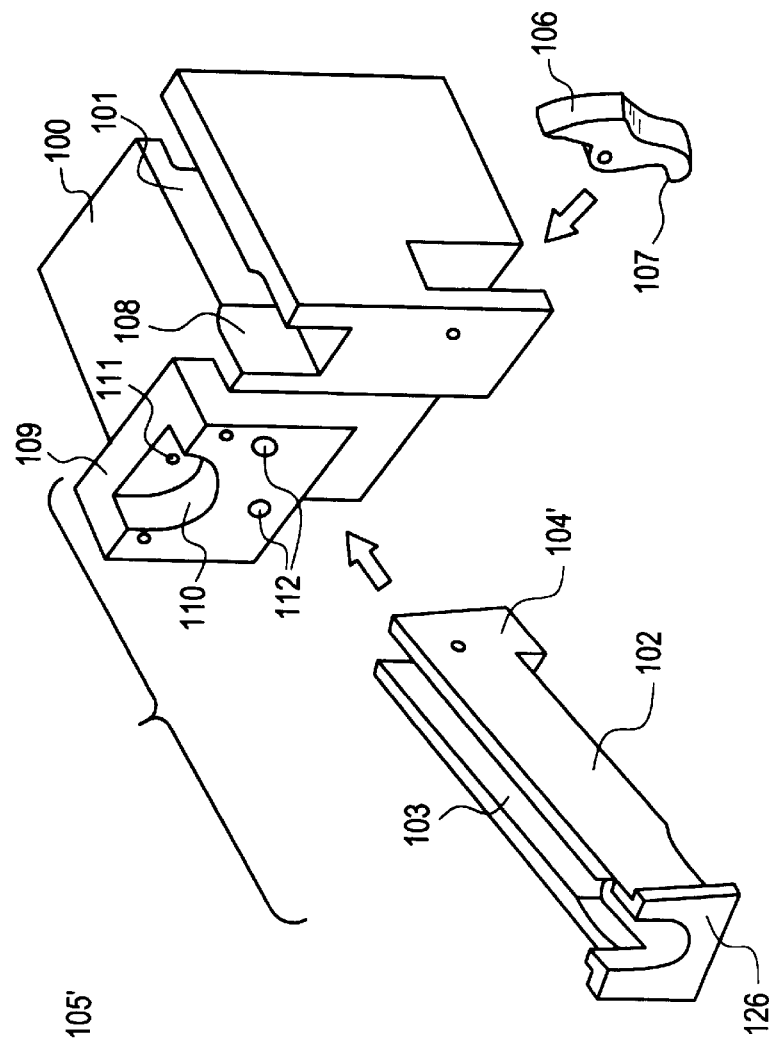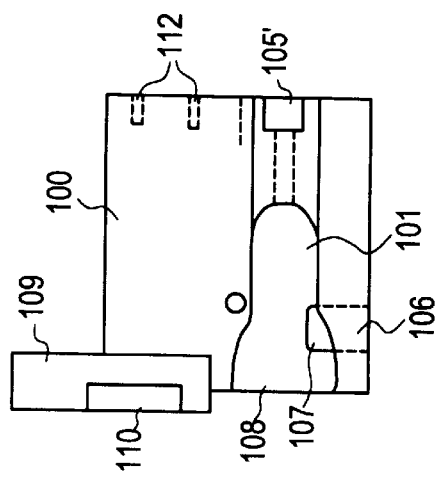

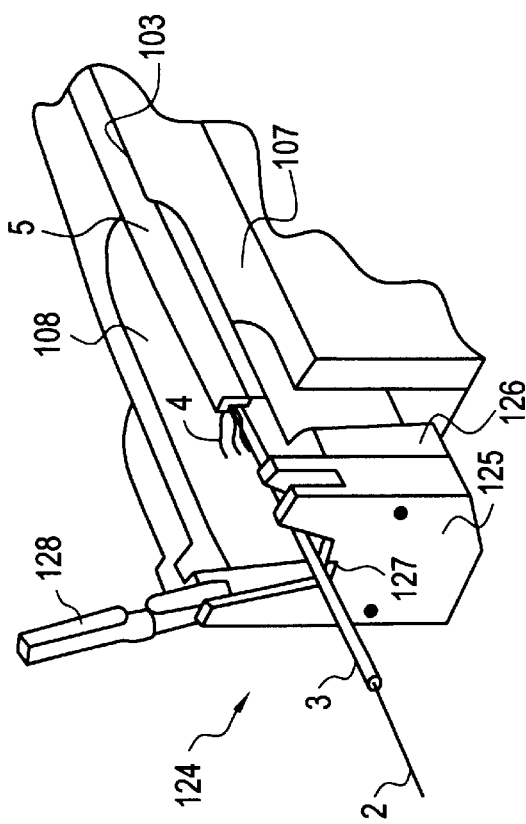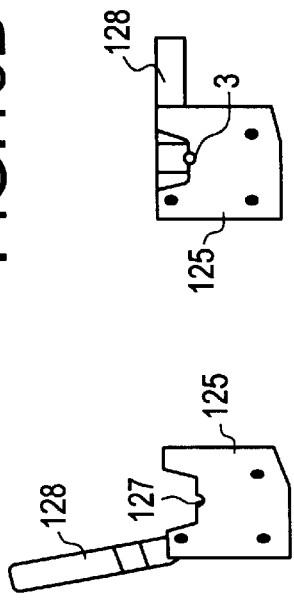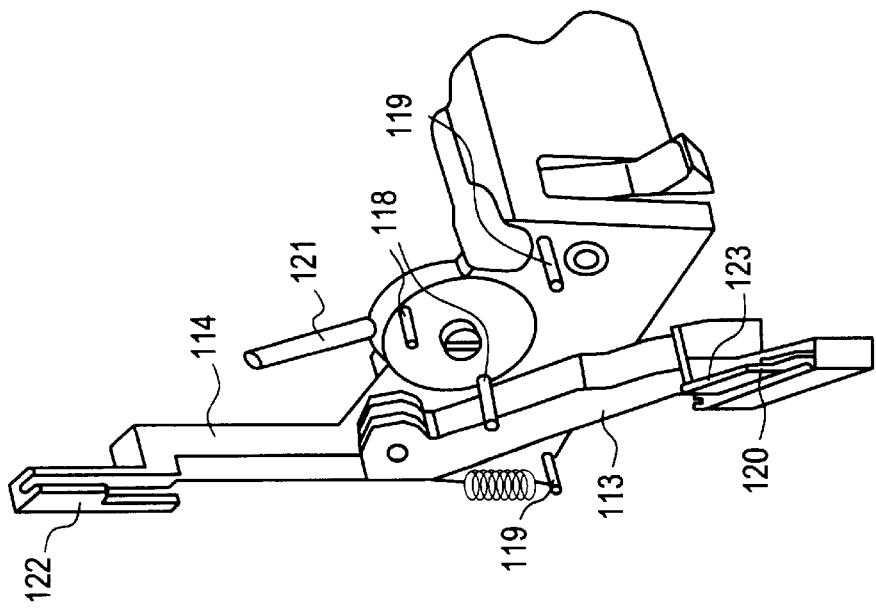

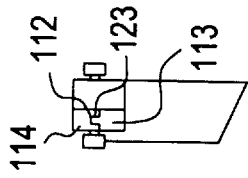
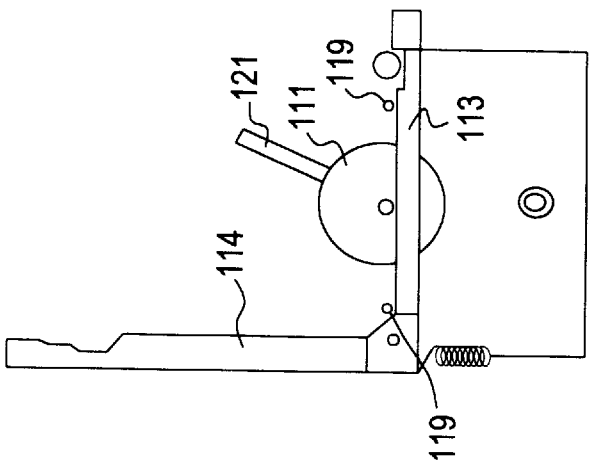
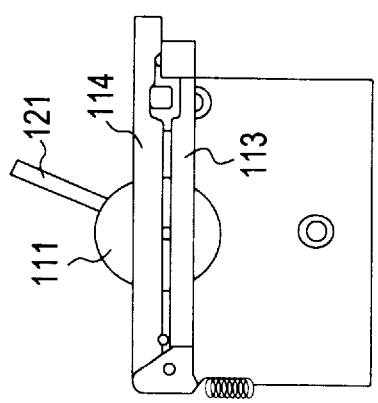
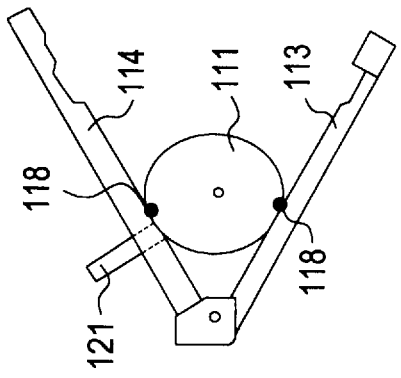

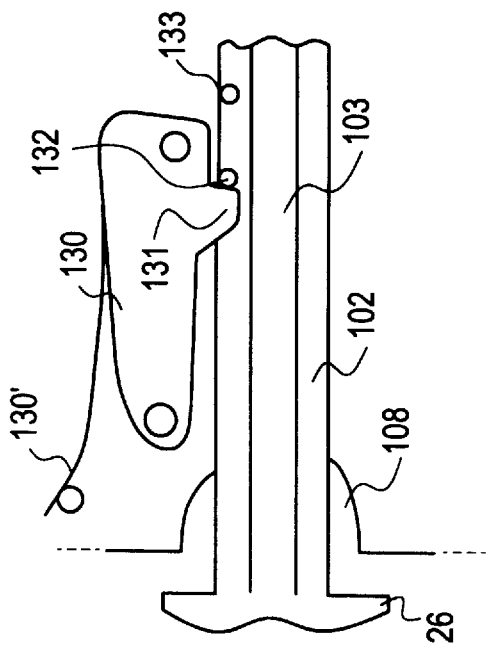
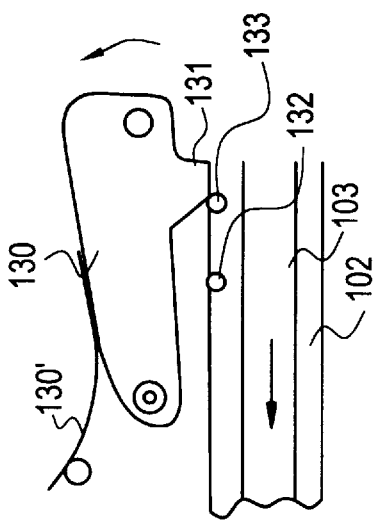

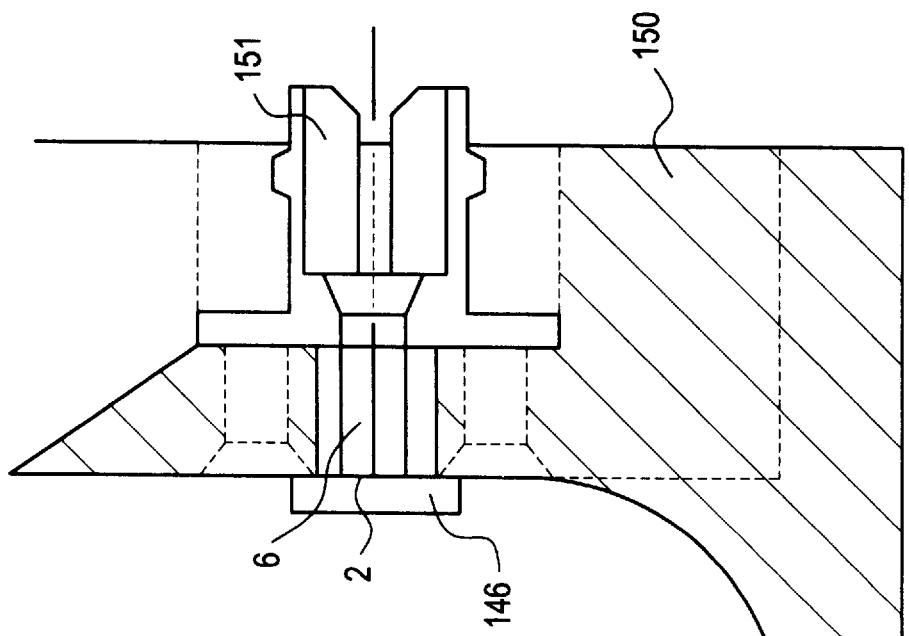
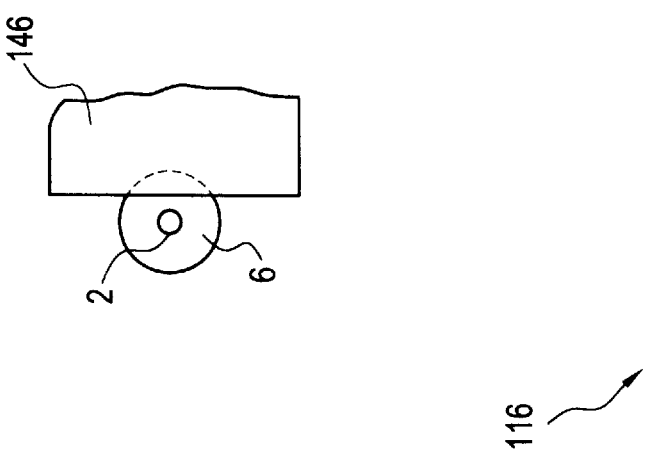

ADHESIVELESS FIBER OPTIC CONNECTOR, AND AN APPARATUS AND METHOD FOR TERMINATING A FIBER OPTIC CABLE TO AN ADHESIVELESS FIBER OPTIC CONNECTOR

BACKGROUND OF THE INVENTION

1. Field of the Invention

This invention relates to the field of fiber optics, and in particular to an adhesiveless fiber optic connector, an apparatus for facilitating termination of a fiber optic cable to an adhesiveless fiber optic connector, and a method of terminating a fiber optic cable to an adhesiveless fiber optic connector.

2. Discussion of Related Art

Light energy generated by a broadband source and modulated to carry information is commonly transmitted by fiber optic systems using fiber optic cables and connectors. Typically, a fiber optic system begins with a source such as a laser which generates a light energy signal and injects it into an optical fiber. The signal travels through the system via a series of optical fibers which are connected in end-to-end fashion by connection assemblies. Each connection assembly is made up of a fiber optic connector attached to or terminated to the end of an optical fiber, and an adapter which receives the ends of the connectors and precisely aligns the optical fibers in the connectors in abutting, end-to-end relationship.

In order to minimize attenuation of the signal as it passes from the optical fiber in one connector to an optical fiber in the adjoining connector, it is imperative that the optical fibers in the connectors be positioned so that they are precisely aligned when the connectors are connected to one another via the adapter. In view of external forces and environmental stresses which are applied to the connectors it is necessary to securely fix the optical fiber within the connector so as to avoid drift or displacement which results in misalignment of the optical fiber when connected in a connection assembly.

A variety of techniques have been proposed to secure an optical fiber of a fiber optic cable within an optical fiber connector. One common method is to inject an adhesive, such as an epoxy, into the connector to fill the space between the optical fiber and the inner surface of the connector. When the adhesive is cured, the optical fiber is held securely in position within the connector.

While adhesives provide good retention of the optical fiber within the connector, they suffer from the disadvantages of being difficult to apply with precision and of requiring time to cure before the optical fiber is held securely. These disadvantages are especially serious for applications where the cable cannot be removed from an installation and in situ termination of the cable to a new connector is necessary.

To avoid the use of adhesives, U.S. Pat. No. 5,088,804, the disclosure of which is hereby incorporated by reference, describes an optical fiber connector which utilizes a deformable, elastomeric material placed within the connector to surround the optical fiber. When the connector is assembled with an optical fiber, the elastomeric material is compressed inwardly around the optical fiber to secure it in position.

Alternatively, U.S. Pat. No. 4,812,006, the disclosure of which is hereby incorporated by reference, discloses an adhesiveless retention mechanism for an optical fiber cable connector which utilizes a compressible collet which, when fully inserted in the connector, is compressed inwardly and clamps against the outside of the fiber optic cable.

In addition, U.S. Pat. No. 5,140,662, the disclosure of which is hereby incorporated by reference, discloses an adhesiveless retention arrangement in which the main body of the connector is crimped directly to the cable, eliminating any sort of collet or separate retention arrangement.

While effectively eliminating the need for adhesives, the elastomeric retention and collet retention techniques of the type described in the above-cited patents, as well as other known techniques for securing optical fiber within connectors without the need for adhesives, have a number of disadvantages. These disadvantages generally include decreased stability relative to adhesive-based arrangements, and/or relative complexity. Even where adequate resistance to drift is achieved, the problem of aligning the relatively small optical fibers with openings in the connector, while at the same time manipulating the termination arrangements, requires at least a high level of skill or training, and makes field installation difficult.

SUMMARY OF THE INVENTION

It is accordingly a first objective the invention to provide a fiber optic connector to which a fiber optic cable may be terminated without the need for adhesives, and yet which provides improved stability relative to conventional adhesiveless fiber optic connectors so as to minimize attenuation of optical signals at the fiber-to-fiber interface.

It is a second objective of the invention to provide a fiber optic connector that uses a main body cast from suitable liquid metals, alloys, or polymers, and a collet arrangement which fits within the main body in place of adhesive or epoxy based glue to compress, swage, and adhesively bond a compressive material to the fiber and the main body so as to provide improved stability and minimization of attenuation of optical signals at the fiber-to-fiber interface.

It is a third objective of the invention to provide a fiber optic connector to which a fiber optic cable can be terminated under field conditions by a person with minimal instruction or training.

It is a fourth objective of the invention to provide an ST multimode adhesiveless connector which meets the above objectives of the invention.

It is a fifth objective of the invention to provide apparatus for facilitating termination of a fiber optic cable to an adhesiveless fiber optic connector, so that termination of the fiber to the connector can be performed by a field installer with minimal instruction.

It is a sixth objective of the invention to provide a method of terminating a fiber optic cable to an adhesiveless fiber optic connector, which provides improved stability and attenuation properties relative to conventional adhesiveless connection methods, and which can be performed by a field installer with minimal instruction.

These objectives are accomplished, according to a preferred embodiment of the invention, by providing an adhesiveless fiber optic connector in which an optical fiber, buffer, dielectric layer or strength member, and jacket of a fiber optic cable are secured in the connector by a collet mechanism having cable gripping fingers for initially gripping the fiber buffer upon movement of the collet into a body of the connector, and which is subsequently secured to the buffer by crimping, the crimping operation also securing the jacket to the main body of the connector and the main body of the connector to the collet, and by providing the collet with keying tabs which cooperate with slots in the main body to initially hold the collet in the connector and prevent rotation of the collet, the key forming an interference fit upon pushing of the collet into the connector, and the material of the collet being selected so that when the collet is crimped against the buffer, the collet adheres to the main body and securely fixes the collet to the main body without the need for addition of adhesive materials.

The objectives of the invention are also achieved, in accordance with a preferred embodiment of the invention, by providing apparatus for facilitating termination of a fiber optic cable to an adhesiveless connector which includes mechanisms for transporting a prepared cable along a predetermined path towards a connector, for guiding an optical fiber extending from the cable towards an appropriate opening in the connector as the cable is moved by the transporting mechanism, for securing the cable buffer to the transporting mechanism during transport, and for releasing the cable and pushing the collet into the connector upon positioning of the cable in the connector to retain the collet in the connector for crimping.

By providing mechanisms for guiding the fiber and securing the cable buffer to the transport mechanism, the apparatus of the preferred embodiment frees the installer from the task of manually guiding the fiber while at the same time attempting to manipulate the cable-to-connector securing features.

Finally, the objectives of the invention are achieved in accordance with a preferred embodiment of the invention, by providing a method of terminating a fiber optic cable to a connector including the steps of preparing a cable by exposing the optical fiber, buffer and insulating or strength layer, capturing the optical fiber within guiding means in the form of pivotal jaws, securing the optical fiber to a transporting mechanism by means of the cable buffer, and moving the transporting mechanism so as to insert the cable into the connector body until the buffer abuts a limit surface at one of the jaws or an equivalent stop, releasing the cable buffer from the transporting mechanism, causing the transporting mechanism to continue to push on the collet until the collet engages the cable buffer, and crimping the main body to the collet, the collet to the buffer, the cable strength member to the main body, and a crimping ferrule to the cable jacket.

BRIEF DESCRIPTION OF THE DRAWINGS

FIG. 1 is a cross-sectional side view of an assembled adhesiveless fiber optic connector constructed in accordance with the principles of a preferred embodiment of the invention.

FIG. 2 is a cross-sectional side view of the main body of the adhesiveless fiber optic connector illustrated in FIG. 1.

FIG. 3 is an end view of the main body illustrated in FIG. 2.

FIG. 4 is a perspective view of a collet used in the adhesiveless fiber optic connector of FIG. 1.

FIG. 5 is a perspective view of one of the two symmetrical members which make up the collet illustrated in FIG. 4.

FIG. 6 is a cross-sectional side view of the main body illustrated in FIGS. 2 and 3 and the collet illustrated in FIG. 4, after the collet has been latched into the main body but prior to the beginning of cable termination.

FIG. 7 is a cross-sectional side view of the main body and collet illustrated in FIG. 6, after pushing to the key limit.

FIG. 8 is a cross-sectional side view of the main body and collet illustrated in FIG. 6, after insertion of the collet into the main body during termination but prior to crimping.

FIG. 10 is a perspective view of an alignment block, transport mechanism, and release lever for a cable termination apparatus constructed in accordance with the principles of a preferred embodiment of the invention.

FIG. 11 is a plan view of the alignment block illustrated in FIG. 10.

FIG. 12 is a perspective view of an optical fiber guiding mechanism for the preferred cable termination apparatus.

FIGS. 13A–13C are front elevations of the optical fiber guiding mechanism illustrated in FIG. 12.

FIG. 14 is a side view of a portion of the optical fiber guiding mechanism illustrated in FIG. 12.

FIG. 15 is a perspective view of a mechanism for securing a fiber optic cable buffer to the transport mechanism of the preferred cable termination apparatus.

FIGS. 16A and 16B are elevations of the buffer securing mechanism illustrated in FIG. 15.

FIGS. 21A and 21B are plan view of a variation of the preferred embodiment of the invention which includes an alternative stop mechanism for positively limiting movement of the preferred cable translating mechanism.

FIG. 22 is a cross-sectional side view showing the connector holding and positioning mechanism used in the preferred embodiment.

FIG. 23 is a front view of a portion of the connector holding and positioning mechanism shown in FIG. 22.

DETAILED DESCRIPTION OF THE PREFERRED EMBODIMENTS

Figure 9:
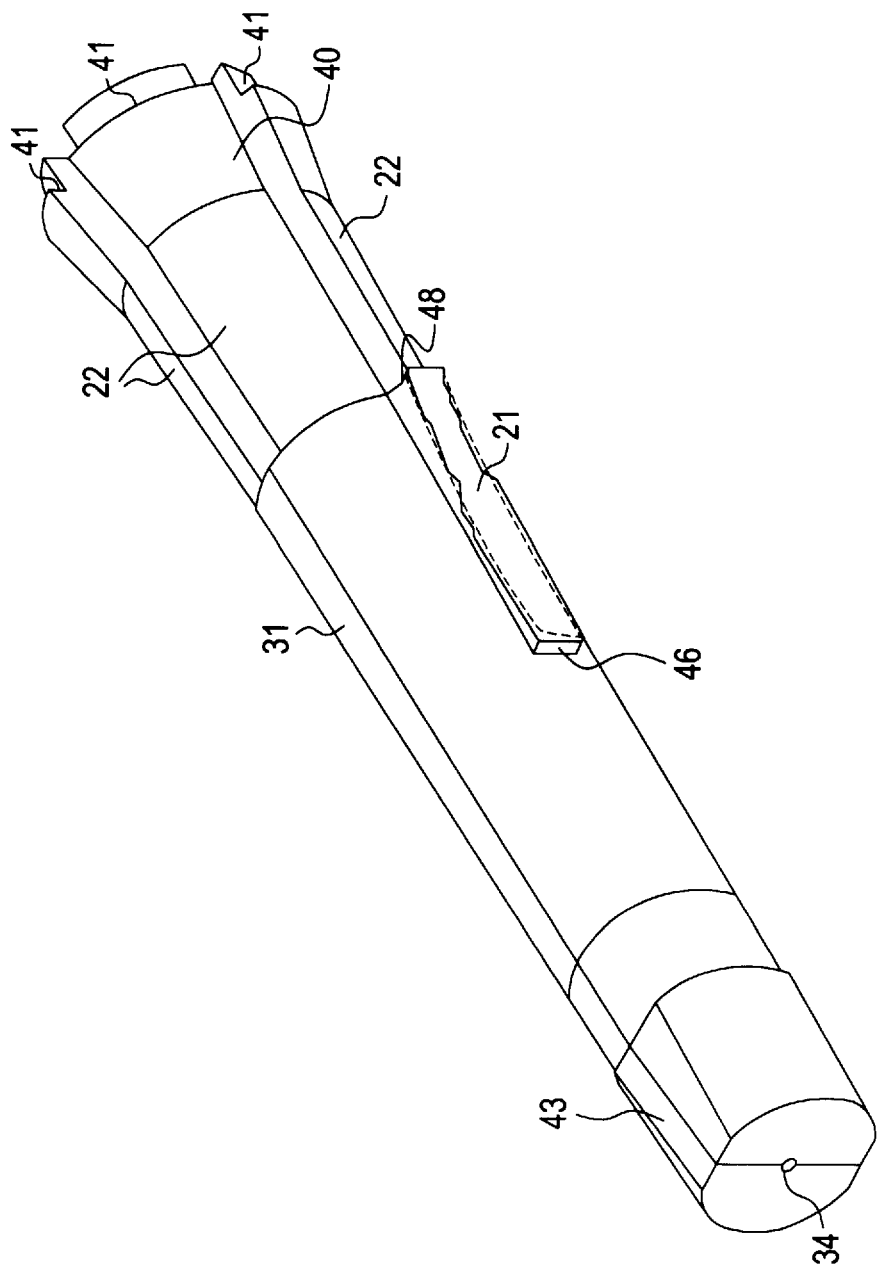
FIG. 9 is a perspective view of the collet illustrated in FIG. 4, after crimping.

FIG. 1 shows a fully-assembled fiber optic connector constructed according to a preferred embodiment of the invention.

Many of the features of the connector illustrated in FIG. 1, which will be described in more detail below, are conventional, including the use of a collet 17 which is inserted between a main body 7 of the connector and the fiber buffer 3, and which includes means for gripping the buffer as the collet is pushed into the main body, the collet subsequently being crimped to provide an adhesiveless means for securing the cable within the connector. However, the connector illustrated in FIG. 1 includes at least two features which are not conventional, and which offer the advantages of retaining the collet in the main body before the beginning of termination, of preventing rotation of the collet during termination, and of assisting in the securing process following termination. These features are the inclusion of slots 27 in main body 7, illustrated in greater detail in FIGS. 2 and 3, and keys 21 on collet 17, illustrated in greater detail in FIGS. 4–9. The keys 21 fit into slots 27 to retain the collet 17 in the main body 7 and prevent rotation of the collet before and during initial insertion of the fiber into the connector, are subsequently pushed partly out of the slots to create a frictional lock between the collet and the main body before crimping, and finally facilitate the formation of a cohesive bond by cold adhesion between the main body and the connector following crimping. Although use of the collet of the preferred embodiment thus provides the advantages of using an adhesive, positively preventing drift, those skilled in the art will appreciate that the connector may still be considered an adhesiveless connector since no separate adhesive is used, and because the steps of applying and drying an adhesive are eliminated from the termination process.

As shown in FIG. 1, the fiber optic cable 1 to which the connector of the preferred embodiment is terminated is made up, as is conventional, of a glass fiber 2, a buffer 3 surrounding the fiber, a strength member 4, and a jacket 5. The fiber is positioned within a central bore 6' of an alignment ferrule 6, conventionally made of a ceramic material, and the alignment ferrule is positioned in a main body 7 of the connector, although it will be appreciated by those skilled in the art that the alignment ferrule could also be insert molded into the main body, or even made of the same material as the main body and molded therewith, or alternatively the main body could be made of multiple members, one of which fits inside the other to support the alignment ferrule, with the collet (described below) fitting into the outer portion of the main body.

A coupling nut 10 provided with inner threads (not shown) and an inwardly extending flange 12 is mounted on the connector main body 7, and a coil spring 10' is positioned between a collar 11 at the front of the main body 7 and flange 12 to bias the connector body, and also the alignment ferrule, forwardly when the coupling nut is secured to a mating connector so that the front surface of the alignment ferrule abuts against a corresponding surface of an alignment ferrule of the mating connector. The coupling nut 10 is retained on the connector main body 7 before mating by a snap ring or c-clip 13 situated in a groove 14 on the connector body, and the ferrule 6 is retained within the connector main body by an interference fit and axially positioned by a shoulder 8 at the rear of the ferrule-receiving opening 24.

The cable is secured in the fiber optic connector by the above-mentioned collet 17 and a crimp ferrule 18. In the position illustrated in FIG. 1, the glass fiber 2 of the cable has been inserted through the collet and central bore 6' of ferrule 6 so that is extends past the end of the ferrule for subsequent cutting and polishing according to conventional methods. The fiber buffer 3, on the other hand, extends only partially into a central passage 20 in collet 17, while the strength member 4 of the cable has been separated from the buffer and extends around the outside of the collet.

The collet is held within the main body 7 by crimping the main body directly to the collet, and in particular by applying crimping pressure against the main body in the area of keys 21, causing keys 21 to deform and adhere to the main body, while the strength member 4 of the cable is secured to the connector by crimping it between crimp ferrule 18 and collet 17, and the jacket 5 of the cable is further secured by crimping the rear of the crimp ferrule 18 to form an inwardly extending gripping section 17'.

In addition, cable gripping arms 22 extending to the rear of the collet have been cammed inwardly upon insertion of the collet to its final position relative main body so as to grip the fiber buffer 3, as will be described in greater detail below, thus securing the fiber within the connector and eliminating the possibility of drift which would lead to misalignment of fibers after mating to a corresponding connector. Finally, a boot 23 is fitted over the crimp ferrule 18 to provide strain relief for the cable 1.

As shown in greater detail in FIGS. 2 and 3, details of the connector main body 7 include collar 11 for engaging the front end of coil spring 10', a cylindrical bore 24 at the front of the main body for receiving the ceramic fiber alignment ferrule 6, groove 14 for receiving nut-retaining c-clip 15, and tapered rear passage 25 for receiving a correspondingly tapered front portion of collet 17. In addition, main body 7 features ribs 26 formed by crimping to provide improved retention of the cable strength member following crimping, key slots 27 for cooperating with keys 21 to retain the collet in the connector prior to termination, as will be explained in greater detail below, and a polarization key 28 which is part of the standard ST connector design and cooperates with a corresponding key on a mating connector.

The connector main body 7 may be made from a material such as stainless steel or mild steel, or a polymeric material, including insert molded materials, but a die cast alloy such as Zamac is preferred. Potentially suitable materials for the collet include liquid crystal polymers and other thermosets or epoxy resins containing fillers and additives as necessary to provide high thermal, flow, and dimensional stability, including polyphenylene sulphides, polyethylethylketones, and other polymeric composites, all of which are within the scope of the invention, but the preferred materials for the collet are resin copolyesters such as poly benzoate-napthoate or poly naphtoate-aminophenoterephthalate. The latter materials are particularly preferred because of their adhesion properties when subjected to pressure from the main body during crimping, with the heavy zinc complex ions in the Zamac material of the main body actually adhering to oxidizing agents in the resin copolyester material by localized cohesive bonding.

Although the illustrated connector is an ST type connector, it will be appreciated by those skilled in the art that the principles of the illustrated collet may be adapted for use in connectors other than the illustrated connector, the outer housing of the connector and the fiber alignment ferrule being described herein for illustrative purposes only.

Collet 17 is illustrated in greater detail in FIGS. 4–9, and is made up of two symmetrical halves 30 and 31, each including a locating pin 32 and an opening 33, a v-groove 34 for locating the glass fiber 2 stripped of its buffer 3, a larger groove 35 extending to the rear of groove 34 including tapered entry portion 34' for locating the fiber buffer, a frustoconical intermediate passage 36 between grooves 34 and 35 for guiding a fiber into the groove 34, and the above-mentioned cable gripping arms 22 including surfaces 37 for gripping the cable buffer 3, with respective keys 21 being situated midway along opposite edges of two of the arms 22. A ramp surface 40 on the edge of each arm slopes outwardly from the key 21 to the rear of the collet, and a shoulder 41 extends between the ramp surface and a rear section 42 of the collet in a direction transverse to the collet axis.

The nose or front section 43 of collet 17 wedges into the surface of tapered intermediate section 25 of main body 7, while the opposite end of the collet, including ramp surfaces 40, engages the main body 6 upon pushing of the collet into the connector during cable termination, and causes the arms 22 to flex inwardly and grip the buffer 3 of the cable as the collet is pushed further into the connector. The height and compressibility of keys 21 is such that the keys 21 can compress sufficiently to pass into the slots 27 through the rear section of the main body 7 after the collet has been assembled by press fitting pins 32 into openings 33, with the restoring force on keys 21 causing them to extend into the corresponding slots 27 upon passage through the rear section such that the rear edges 46 of the keys 21 cooperate with the rear edges 47 of slots 27 and the forward edges 48 of the keys cooperate with the front edges 49 of the slots to retain the keys in the slots and the collet within the connector body prior to termination. The position of the keys in the slots permits the collet to conveniently be retained in the main body so that the collet does not need to be handled during termination.

The functions of the keys 21 is illustrated in FIGS. 6–8. FIGS. 6 and 7 respectively show the rearward and forward limits of key movement within slot 27, before the collet is forced further into the main body in order to grip the cable, while FIG. 8 shows the position of the collet after the front edge 48 of each key has been pushed past front edge 49 of slots 27 and the collet is in its final position relative to the main body prior to crimping.

Before the beginning of termination, as shown in FIGS. 6 and 7, the collet can shunt backwards and forwards over a short distance determined by the difference in elongated lengths of the slot openings 27 and the length of the keys 21, with movement of the collet being limited by engagement between edges 46 and 48 of the keys and edges 47 and 49 of the slots, thereby retaining the collet loosely in the connector and eliminating the need to for the installer to locate and handle the collet. For an ST connector, an appropriate shunting distance would be on the order of 0.01". In addition, the collet is prevented from rotation by engagement between the sides of the keys and the sides of the slots.

As the collet assembly is shunted forwards, the front face of the collet is positioned just inside the inner wall taper 25 formed in the cylindrical bore 24 of the connector body. Because the forward edges 48 of the keys 21 are lower than the rear edges 46, and only slightly higher than the corresponding front edges 49 of slots 27, an increase in pressure at the rear of the collet following shunting of the key 21 to the position shown in FIG. 7 at the front of the slot causes the key edges 48 to deform and pass beneath the edges 49 of the slot. The top surface 50 of the keys is slightly concave in shape to permit further insertion of the collet into the main body until the height of the top surface increases towards the rear of the keys, at which point, as shown in FIG. 8, an interference fit between the keys and the main body is achieved, and the gripping arms 22 extending towards the rear of the collet have been cammed inwardly against the cable buffer 3 by engagement between tapered sections 40 and the inner surface at the rear of the main body.

In this position, the front edges of the v-grooves 34 in the collet correspondingly wrap around the edge of the glass fiber. Further forward pressure causes the collet to guide and so limit the position of the fiber, with the friction fit of the collet v-groove around the bare fiber limiting the forward position of the bare fiber and so determining the stop position for the front face of the collet assembly. The bare fiber end extends through central bore 6' and protrudes from the front face of the ferrule 6 inserted in the main body 7. A tool for providing the necessary forward pressure against the back faces of the collet assembly can be used, as described below, although it will be appreciated that the collet may be pushed into the main body by apparatus other than the illustrated apparatus. After insertion to the limit of forward movement, the collet assembly is secured by crimping the back of the main body as shown in FIG. 8 to form gated pair edges or ribs 26 in the area indicated by reference numeral 52, and at the same time deform the keys to cause them to adhere to the inner surface of the main body, as described above, and as illustrated in detail in FIG. 9.

The preferred fixture or apparatus for terminating fiber optic cable 1 to the ST collar connector described above is shown in FIGS. 10–18. While other tools or methods could be used, the illustrated cable termination apparatus is particularly advantageous because it can be used by an installer, with minimal training or instruction, under field conditions and with minimal installation time. The apparatus consists in general of an alignment block 100, shown in FIGS. 10 and 11, a cable translating mechanism 102 supported in a groove 101 of the alignment block and also shown in FIG. 10, a jaw mechanism supported by the alignment block for guiding the bare fiber of the cable as it is moved by the cable translating mechanism, as shown in FIGS. 12–14, a fiber buffer clamping mechanism which includes a main body 125 attached to the front 126 of the translating mechanism 102 as shown in FIGS. 15, 16A, and 16B, a crimping mechanism 115 shown in FIGS. 17–19 and a fiber cutting mechanism 117 shown in FIG. 18. FIG. 18 also gives an overall view of the entire apparatus, from the cable transporting mechanism to the crimping and cutting mechanisms, all of which are fixed relative to a base or the bottom of a carrying case for convenient handling. Finally, FIGS. 19 and 22 also show a in detail an x-y translating mechanism made up of blocks and guides 148, 148', 149, and 149', and stops 159–161, for moving the connector holder mechanism 116 between an initial position suitable for loading the cable into the connector and performing the initial crimping operation, and two additional crimping positions.

As shown in FIGS. 10 and 11, the alignment block 100 is formed by a metallic block having overall dimensions approximately those of a 2" cube. A long groove or slot 101 approximately ⅛" wide by 3.75" long is cut in the top surface of block 100 to accommodate a cable translating mechanism 102 which is manually movable along an axis of the slot. A smaller cable supporting slot 103 extends along the top of the translating mechanism 102 in the direction of movement. Translating mechanism 102 is arranged to guide a fiber into a connector upon coupling of the connector to a holder fixed relative to the alignment block, following clamping of the fiber buffer to the translating mechanism by means of the clamping mechanism illustrated in FIGS. 15, 16A, and 16B, as described in more detail below, while the fiber itself is guided by the jaw mechanism illustrated in FIGS. 12–14, and also described in detail below.

Also attached to the alignment block 100 is a spring loaded rocker 106 having an end 107 which in a first position extends into an enlarged portion 108 of slot 101 at the front of the alignment block to keep the translating mechanism 102 from falling into the enlarged portion 108, which is deeper than the remainder of the slot, and which when pushed to a second position after the cable translating mechanism has been moved to a forward position to project forwardly of the alignment block, exits the enlarged portion 108 to permit the cable translating mechanism to be tilted into the slot and away from the axis of cable insertion.

Attached to the front of the cable translating mechanism 102 is a cable clamping mechanism 124, as illustrated in FIGS. 15, 16A, and 16B. Clamping mechanism 124 includes a buffer guide head 125 secured to a flange 126 at the front of the translating mechanism, a v-groove 127 situated at the top of the head member for positioning the cable buffer 3, and a buffer clamping lever 128 pivotally mounted on buffer guide head 125 to secure the cable buffer during cable transport.

The alignment block also includes a jaw mechanism support 109 having a seat 110 for a jaw mechanism actuator wheel 111, a mounting hole for wheel 111, and mounting holes 112 for the individual jaws 113 and 114 of the jaw mechanism, which is illustrated in FIGS. 12–14. The jaw mechanism support 109 extends forwardly of the cable translating mechanism slot 101 so that when the jaws are mounted thereto and in the closed position shown in FIG. 13A, the jaws are positioned a predetermined distance from the slot opening to define a forward limit for manual movement the translating mechanism, further movement of the translating mechanism being permitted only after opening of the jaws to the position shown in FIG. 13C.

Figure 17:
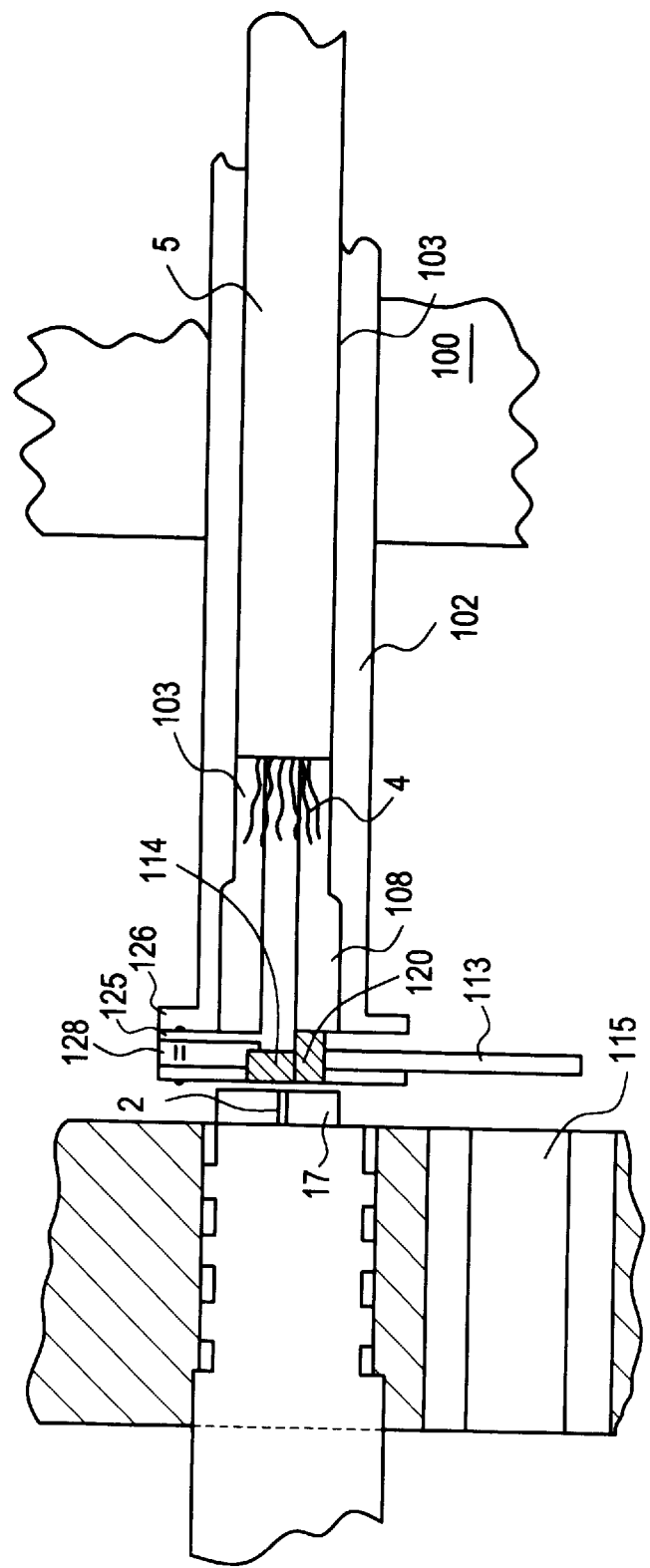
FIG. 17 is a partially cross-sectional top view showing a crimping mechanism of the preferred cable termination apparatus, and the transport mechanism after a fiber optic cable has been transported into a final position in a fiber optic connector.
Figure 18:
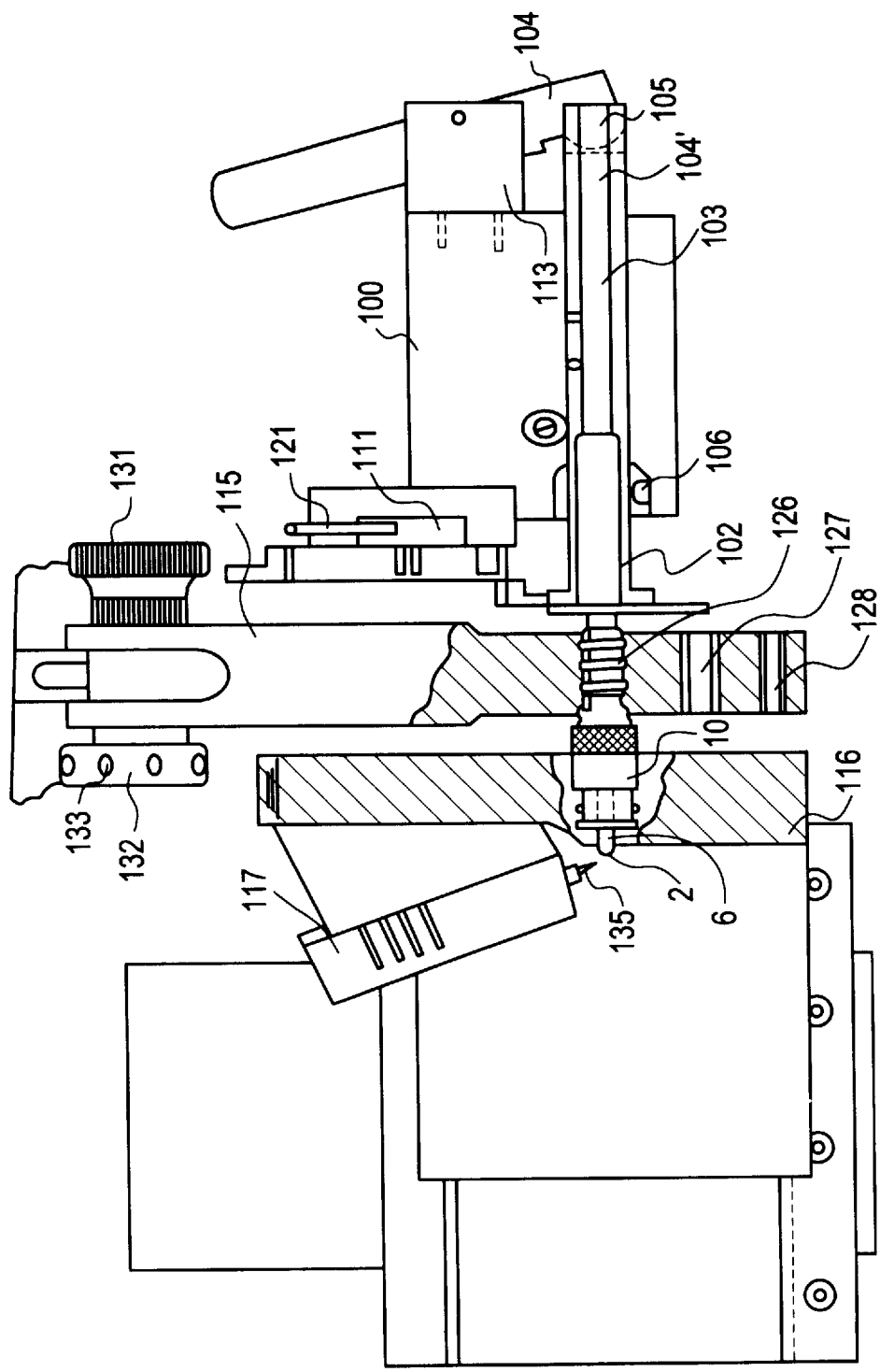
FIG. 18 is a partially cross-sectional side view of the preferred cable termination apparatus following transport of the cable to the position shown in FIG. 17, including a crimping mechanism and fiber cutting and polishing mechanism.
Figure 19:
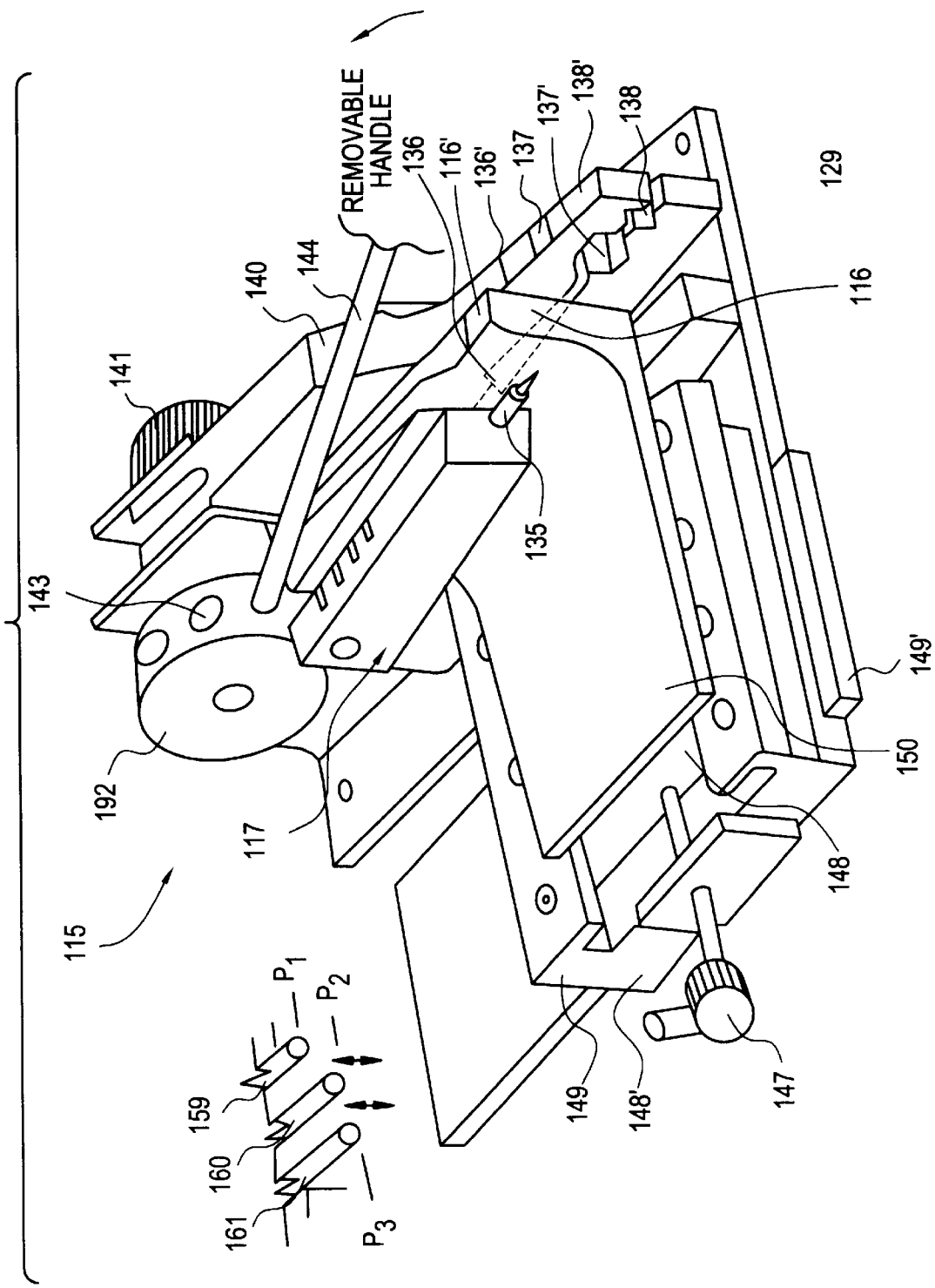
FIG. 19 is a perspective view of the crimping mechanism and the fiber cutting and polishing mechanism illustrated in FIGS. 17 and 18.

Finally, the crimp mechanism 115, shown in FIGS. 17–19, a connector holder 116 shown in FIG. 18 which preferably includes a keyway (not shown) for orienting the connector body relative to the alignment block, and a fiber cutting mechanism 117, also illustrated in FIGS. 18 and 19.

The purpose of jaws 113 and 114 is to support and guide the bare optical fiber into the connector. The jaw mechanism, as shown in FIGS. 12–14, includes jaws 113 and 114, actuator wheel 111, pins 118 for engaging and separating the jaws upon movement of the wheel 111, stops 119 for limiting movement of the jaws, and a lever 121 for moving the actuator wheel. Lower jaw 113 includes an alignment head v-groove 120 having a marking along its length to indicate initial placement of the optical fiber 2. Upper jaw 114 is arranged to capture the optical fiber in the alignment head v-groove 120 and includes limit surface 122 which cooperates with surface 123 on the lower jaw for limiting forward movement of the cable by engagement with the buffer 3 of the cable during termination, as best shown in FIG. 17.

At the rear of the alignment block 100 is mounted a lever 104, shown in FIG. 18, having an end 105 which engages a downwardly depending rear section 104' of cable translator 102 in a notch 105' below the slot to move the cable translating mechanism forwardly within the slot under increased pressure to the position shown in FIG. 17 after the cable has already been positioned in the connector, as will be described in more detail below. Mounting holes 112' are included at the rear of the alignment block for attaching the mounting block 113 for lever 104.

The crimp mechanism 115, best shown in FIG. 19, includes at least three crimp openings 136–138 formed by jaws 139 and 140, for respectively crimping collet 17, strength member 4, and jacket 5, as described above. To permit the respective crimping operations to be successively performed while maintaining alignment between the jaws and the area to be crimped, jaws 139 and 140 are slidable transversely to the axis of the connector to selectively bring the different crimp opening into position relative to the connector, and also are adjustable parallel to the axis of the connector so as to provide the necessary alignment. Movement and adjustment of the crimp jaws can be provided by a manual actuator 141 and an actuator 142, actuator 142 having openings 143 into which can be inserted a tool 144 for providing the necessary leverage to obtain an effective crimp. In order to simplify the crimping process, fiducial marks 136', 137', 138' and 116' may be included on upper jaw 140 and on an upper surface of a bulkhead of the connector holder to assist in aligning the respective crimp openings 136–138 during the crimping process.

The connector holder mechanism 116 includes handle 147 which can be manipulated to translate a first slide block 148 supported by guides 149 and attached to an extension of bulkhead 150 of the holder mechanism, guides 149 being provided on a second slide block 148' also translatable by handle 147 relative to a guide or track 149' to form an x-y translation device. On one side of bulkhead 150, as best shown in FIG. 22, is an adapter 151 to which the connector is attached, while the opposite side of bulkhead 150 includes ferrule stop 146 which precisely defines the position of the ferrule relative to the cutting mechanism 117. The manner in which ferrule stop 146 extends in front of the alignment ferrule of the connector is shown in FIG. 23.

The x-y translation device as shown in FIG. 19 cooperates with three stops 159–161 to position the connector relative to the crimp mechanism 115 and the cable translation device in one of three positions P1, P2, and P3. Stop 159 is fixed and stops 160 and 161 are pivoted into place. Initially, the stops 160 and 161 are pivoted into a non-engaging position and the handle 147 is slid towards the fixture front, at which point the connector is attached to the holder. The handle is then rotated counterclockwise to move the x-y translation mechanism against the fixed stop 160, and locked. Subsequent to the initial crimping, the handle 147 is rotated clockwise to unlock it and moved away from the fixed stop 159, the second stop 160 is pivoted into position, the handle 147 pushed forward to permit placement of the crimp ferrule 18 over the connector main body, and then the handle is moved to position the x-y translation mechanism against stop 161 and the handle rotated into a locked position. Finally, subsequent to the second crimping operation, the handle is again rotated clockwise to unlock it, moved to clear the third stop 161 so that it can be pivoted into place and the x-y translating mechanism moved up against the third stop, and rotated to lock the x-y translating mechanism into position.

The final mechanism including in the claimed apparatus is cutting mechanism 117, depicted in FIGS. 18 and 19 as including a diamond knife 135 of known construction which can be brought into position, after the fiber has been inserted into a connector and secured by crimping and by the action of the collet, so as to cut the fiber and enable polishing or buffing of the fiber and ferrule to form a smooth interface for engagement with a correspondingly prepared fiber and ferrule of a mating connector, thus completing the preferred apparatus for facilitating termination of an optical fiber cable to an adhesiveless fiber optic connector.

Although the back stop of the alignment guide head provides an adequate limit stop for the translating mechanism, it may be preferable to include a separate stop mechanism, as illustrated in FIGS. 20A and 20B. The alternative stop mechanism is in the form of a spring-loaded stop 130 situated at the top of alignment block 100 adjacent the groove 101, so that an extension 131 of the stop 130 extends into the path of two pins 132 and 133 on the translating mechanism 102. When the translating mechanism is pushed forward so that the fiber has been guided into the connector, extension 131 initially engages pin 132 to provide the initial stopping point at which jaws 113 and 114 are released. The stop 130 is then pulled back against the force of a bias spring 130' to release pin 132 so that the translating mechanism can be moved forward to as second position, at which pin 133 engages extension 131 and the buffer guide head 125 is positioned at the back of the collet.

The stop 130 can then be pulled back again to permit further pushing of the collet into the connector.

Figure 20:
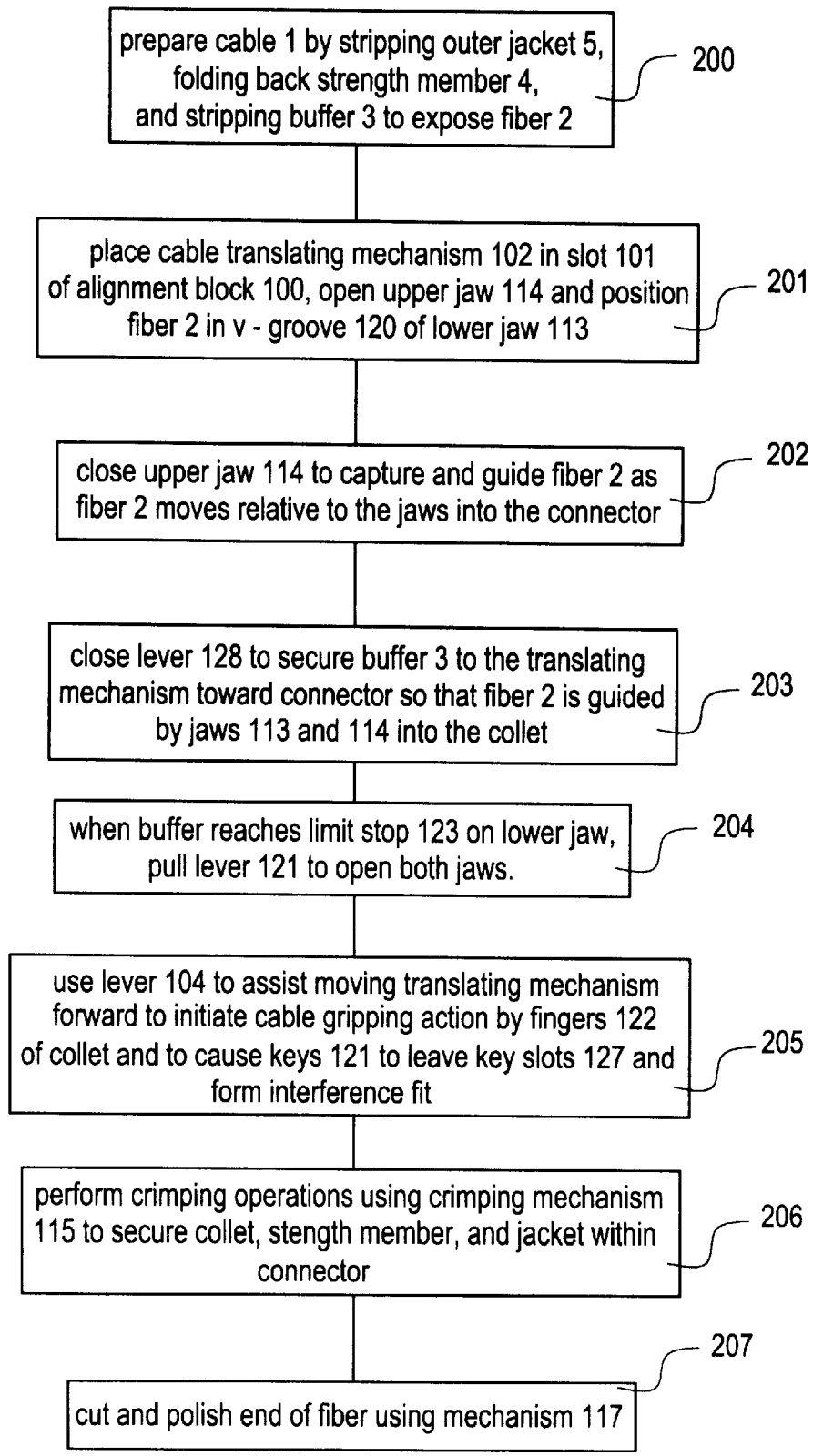
FIG. 20 is a flowchart summarizing a cable termination method according to a preferred embodiment of the invention.

The preferred method of terminating a fiber optic cable to a connector can advantageously use the above-described fixture, but could also be accomplished with other tools or possibly even by hand, and is summarized in the flowchart of FIG. 20.

The first step in terminating a cable according to the preferred method, generally designated by step 200, is to prepare the cable. Initially, the cable is cut to a desired length and the strain relief boot is slid onto the end of the cable. Then, using a template, the outer jacket is stripped to reveal a length of the strength member, typically made of Kevlar™. The strength member is folded back to expose the underlying buffer, which is marked and a portion of the buffer is stripped from the signal-carrying glass fiber at the center of the cable, completing preparation of the cable for termination.

The next step, designated generally by step 201, is carried out after the connector has been secured to connector holder 116 such that the longitudinal axis of the connector is coincident with an axis of the longitudinal groove in the cable transport member, by collet aligning key 21 with a corresponding keying feature on the connector holder, and by securing the coupling nut 10 to a corresponding threaded portion of the connector holder. With the lever 104 in a disengaged position and cable translating mechanism 102 pushed back as far as possible in slot 101 of the alignment block 100, the fiber guiding jaws 113 and 114 are initially positioned as shown in FIG. 13A. The upper jaw 114 is then opened as shown in FIG. 13B. At this time the prepared cable can be positioned in groove 103 of the transport mechanism, with the glass fiber 2 being seated in the v-groove 120 of lower jaw 113 and manually positioned so that the end of the fiber is approximately 1 mm past a marking in the guide slot containing the v-groove.

Then, as indicated by step 202, with the fiber having been axially positioned for transport, the upper jaw 114 is lowered back to the position shown in FIG. 13A and the fiber 2 is captured by the upper jaw 114 so as to retain the fiber in the v-groove while permitting axial movement of the fiber relative to the upper and lower jaws.

Step 203 is carried out after capturing the fiber 2 between jaws 113 and 114, and while holding onto the cable jacket so as to ensure that the cable is properly seated in the transport mechanism slot 103, and involves securing the fiber buffer to the transport mechanism by closing lever 128 to capture the buffer in the buffer positioning slot 127 of the buffer guide head 125, at which time the cable is ready for transport by moving the transport mechanism. If necessary to further secure the cable in the translating mechanism 102 for movement towards the connector held in fixture 116, the cable jacket 5 can also be held by the thumb and forefinger of the hand moving the transport mechanism.

As the transport mechanism is pushed forward towards the closed upper and lower jaws 114 and 113, which it will be recalled are fixed to the guide block so that the jaws are a distance away from the alignment block, the fiber passes through and is guided by the jaws and into the collet 17 of the connector, at which point the fiber is guided by the narrowing passage in the nose of the collet to enter the alignment ferrule 6. Movement of the transport mechanism continues until the fiber buffer 3 reaches the limit stop 123 extending from the upper jaw 114, or until the spring-loaded stop 130 of the variation shown in FIGS. 21A and 21B has engaged pin stop 132, at which point the fiber has been partially inserted into the ferrule and is in the position shown in FIG. 17.

Then, according to step 204, the lower and upper jaws 113 and 114 of the fiber termination apparatus are fully opened to the position shown in FIG. 13C by rotating the lever 121 counter-clockwise to permit further insertion of the fiber into the alignment ferrule 6 and insertion of the buffer into the collet. When the front of the transport mechanism abuts against the rear of the collet, or an equivalent stop, or the extension 131 on spring-loaded stop 130 of the variation shown in FIGS. 21A and 21B has engaged pin 133, the handhold on the cable can be released.

The step of finally positioning the cable in the connector, designated generally by step 205, is accomplished by pushing on lever 104 on mounting block 100 to move the collet further into the connector, thereby causing engagement of the gripping fingers of the collet onto the cable buffer, and forward movement of the keys 21 out of the slots 27 to form an interference fit between the collet and the main body, at which point insertion is complete, lever 128 can be pivoted to unclamp the fiber.

Following release of the cable, the crimping mechanism 115 is positioned to secure the crimp ferrule 18 to collet 17, as well as to secure the strength member 4 and jacket 5 as described above. This step is designated in FIG. 20 as step 206, and involves positioning of the crimping mechanism in conjunction with manipulation of handle 147 and stops 159–161 in the manner described in more detail above. Prior to loading of the cable, the crimping mechanism has been positioned to as to place opening 136 over the rear of the connector so that opening 136 is in a position to crimp the main body of the connector to the collet. Subsequently, handle 147 is released and manipulated to move permit placement of the crimp ferrule 18 over the main body movement of the main body into a position where opening 137 of the crimping mechanism can be placed over the crimp ferrule 18 to secure the strength member, and again manipulated to place the connector in a position where opening 138 can be placed over the small diameter of the crimp sleeve and thereby secure the crimp sleeve to the cable jacket.

Finally, in step 207, after placing the boot 23 over the crimp ferrule to the position shown in FIG. 1, the connector is ready for cleaving of the excess fiber from the front end of the alignment ferrule 6 using cutting mechanism 135. The connector can then be released from its holder and lever 106 can be pushed to cause the translating mechanism 102 to drop into enlarged portion 108 of slot 103 and thereby release the cable from the transport mechanism. Subsequently the connector may be placed on a standard polishing fixture that accommodates the assembled connector. A plastic plate may also be placed on the flat of the fixture plate for rapid hand polishing, or a battery operated polishing wheel could be mounted in unison with the cutting tool. Finally, after polishing, a dust or safety cap (not shown) can be used to cap the ferrule and protect the fiber interface prior to coupling to another connector.

Having thus described various preferred embodiments of the invention, those skilled in the art will appreciate that variations and modifications of the preferred embodiment may be made without departing from the scope of he invention. It is accordingly intended that the invention not be limited by the above description or accompanying drawings, but that it be defined solely in accordance with the appended claims.

We claim:

1. Apparatus for terminating a fiber optic cable having a fiber buffer to an adhesiveless fiber optic connector, the fiber buffer being gripped by a collet when the fiber buffer is inserted into the collet and the collet is pushed into the connector, comprising:

an alignment block having a longitudinal slot;

a cable translating mechanism slidable in said slot from a first translating mechanism position through an intermediate translating mechanism position to a second translating mechanism position;

a device attached to a front end of the translating mechanism for clamping said fiber buffer to the translating mechanism to cause the fiber buffer and therefore the cable to be moved together with the translating mechanism as it is moved from said first translating mechanism position to the intermediate translating mechanism position;

lower and upper fiber guiding jaws pivotal between a first guiding jaw position, a second guiding jaw position, and a third guiding jaw position, wherein in said first guiding jaw position, a fiber of the cable is seated in a groove in the lower jaw and captured in said groove by the upper jaw so that the fiber is guided between the upper and lower jaws as it is being moved by said translating mechanism, said jaws in said first guiding jaw position being located in a path of movement of the translating mechanism from said first translating mechanism position to said intermediate translating mechanism position so as to prevent movement of said translating mechanism beyond said intermediate position, wherein in said second guiding jaw position, said jaws are partially spaced apart so that the fiber can be positioned in the groove before capture by the upper guiding jaw, and wherein in said third guiding jaw position, the jaws are further spaced apart to permit passage of the translating mechanism from said intermediate translating mechanism position to said second translating mechanism position, wherein movement of said translating mechanism from the first translating mechanism to said intermediate translating mechanism position causes said fiber to be guided by said jaws into said collet, wherein in said intermediate guiding jaw position said fiber and fiber buffer have been inserted into said collet, and wherein during movement of said translating mechanism from the intermediate translating mechanism position to said second translating mechanism position, said translating mechanism engages said collet to cause said collet to be pushed into said connector and grip said fiber buffer.

2. Apparatus as claimed in claim 1, wherein the device attached to a front end of the translating mechanism is a lever for clamping said fiber buffer.

3. Apparatus as claimed in claim 1, wherein the alignment block has additionally mounted thereon a pressure lever arranged to engage the translating mechanism after the translating mechanism has reached said intermediate translating mechanism position and said jaws have been pivoted to said third guiding jaw position to permit further movement of the translating mechanism, said pressure lever being pivoted to move said translating mechanism from said intermediate translating mechanism position to said second translating mechanism position while in engagement with said collet to thereby cause said collet to grip and finally position said cable.

4. Apparatus as claimed in claim 1, said apparatus further comprising a connector positioning mechanism for positioning the connector in the path of the translating mechanism, a crimping mechanism attached to the connector positioning mechanism and movable with respect thereto for crimping the connector following insertion of a cable into the connector by the translating mechanism, and a cable cutting mechanism positioned relative to the connector positioning mechanism so as to provide a means for cutting an end of a fiber of the cable after it has been positioned in the connector.

5. Apparatus as claimed in claim 1, further comprising a rocker lever pivotally mounted in the alignment block to move from a first position in which the rocker lever extends into the slot in the alignment block in which the translating mechanism is guided, to a second position in which the rocker lever exits the slot to permit the front of the translating mechanism to be tilted downward and away from the cable following insertion of the cable into the connector.

6. Apparatus for terminating a fiber optic cable to an adhesiveless fiber optic connector, comprising:

a cable translating mechanism including means for securing a cable thereto for movement with the translating mechanism;

a fiber guiding mechanism for guiding a bare fiber of the cable as it is moved by the translating mechanism;

a connector positioning mechanism for positioning the connector in the path of the translating mechanism;

a crimping mechanism attached to the connector positioning mechanism and movable with respect thereto for crimping the connector following insertion of a cable into the connector by the translating mechanism; and a cable cutting mechanism positioned relative to the connector positioning mechanism so as to provide a means for cutting an end of a fiber of the cable after it has been positioned in the connector.

7. Apparatus as claimed in claim 6, wherein the cable securing means comprises a lever pivotally attached to cable translating mechanism.

8. Apparatus as claimed in claim 6, wherein the fiber guiding means comprises lower and upper fiber guiding jaws pivotal between a first guiding jaw position, a second guiding jaw position, and a third guiding jaw position, wherein said translating mechanism is movable from a first translating mechanism position through an intermediate translating mechanism position to a second translating mechanism position, wherein in said first guiding jaw position, a fiber of the cable is seated in a groove in the lower jaw and captured in said groove by the upper jaw so that the fiber is guided between the upper and lower jaws as it is being moved by said translating mechanism, said jaws in said first guiding jaw position being located in a path of movement of the translating mechanism from said first translating mechanism position to said intermediate translating mechanism position so as to prevent movement of said translating mechanism beyond said intermediate position, wherein in said second guiding jaw position, said jaws are partially spaced apart so that the fiber can be positioned in the groove before capture by the upper guiding jaw, and wherein in said third guiding jaw position, the jaws are further spaced apart to permit passage of the translating mechanism from said intermediate translating mechanism position to said second translating mechanism position.

9. A method of terminating a fiber optic cable to a connector, comprising the steps of:

preparing an optical fiber cable for termination by at least stripping a fiber buffer from a fiber to expose the fiber;

capturing the exposed fiber in a guiding mechanism by placing the exposed fiber in a groove of the guiding mechanism so as to be captured in the groove but relatively movable with respect thereto;

securing the fiber buffer to a cable translating mechanism, and moving the cable translating mechanism relative to a connector positioning means so that the cable is guided by the guiding mechanism into the connector.

10. A method as claimed in claim 9, further comprising the steps of releasing the guiding means after the fiber has been inserted into the connector and using the translating mechanism to further push a collet into the connector and cause arms on the collet to grip the fiber.

11. A method as claimed in claim 9, further comprising the steps of, prior to beginning termination of the cable to the connector, inserting a collet into the connector such that keys extending from the collet snap into slots in the collet and are thereby loosely retained in the connector prior to termination.

12. A method as claimed in claim 11, further comprising the step of, in response to movement of said translating mechanism relative to said connector, causing said keys to exit said slots and deform, and subsequently crimping said connector to cause said keys to form a cohesive bond between the collet and a main body of the connector.

* * * * *